United States Patent

[11] 3,587,621

| [72] | Inventors | Robert A. Mohr;<br>Walter S. Medley, Sacramento, Calif. |
|---|---|---|
| [21] | Appl. No. | 870,928 |
| [22] | Filed | Sept. 18, 1969<br>Division of Ser. No. 722,846, April 22, 1968.<br>Pat. No. 3,495,743. |
| [45] | Patented | June 28, 1971 |
| [73] | Assignee | Community Linen Rental Service<br>Los Angeles, Calif. |

[54] AUTOMATIC ADDITION OF LIQUID CHEMICALS IN LAUNDRIES
1 Claim, 5 Drawing Figs.

[52] U.S. Cl. .................................................. 137/209,
   251/63.5
[51] Int. Cl. .................................................. B67d 5/54
[50] Field of Search .......................................... 137/209;
   251/63.5; 103/234, 40

[56] References Cited
UNITED STATES PATENTS

| 2,008,114 | 7/1935 | Taggart | 103/234X |
| 2,382,562 | 8/1945 | Harvey | 251/63.5X |
| 3,408,949 | 11/1968 | Hart | 103/234 |

Primary Examiner—Alan Cohan
Attorney—Owen, Wickersham and Erickson

ABSTRACT: The closure valve itself comprises a valve seat, a movable valve member normally urged by gravity down away from the seat, and a sleeve with a closed end inverted on a vertical conduit for air with lateral clearance and with its closed end resting on the upper end of the vertical conduit. Kinetic energy forces said sleeve up to move the valve member up, the length of said sleeve being greater than its upward movement up.

A plurality of systems are used with a plurality of washing machines with automatic program devices.

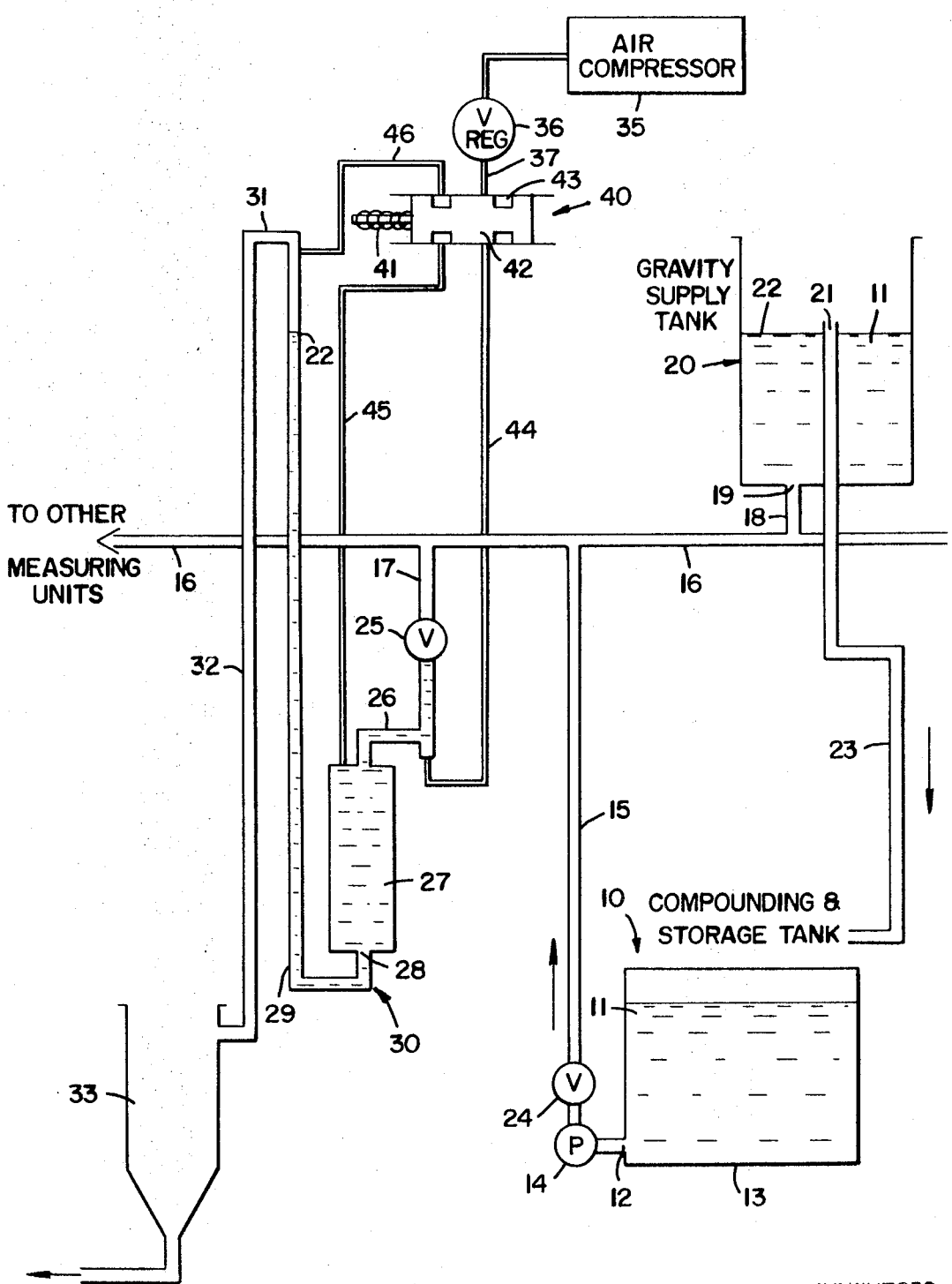
FIG_1

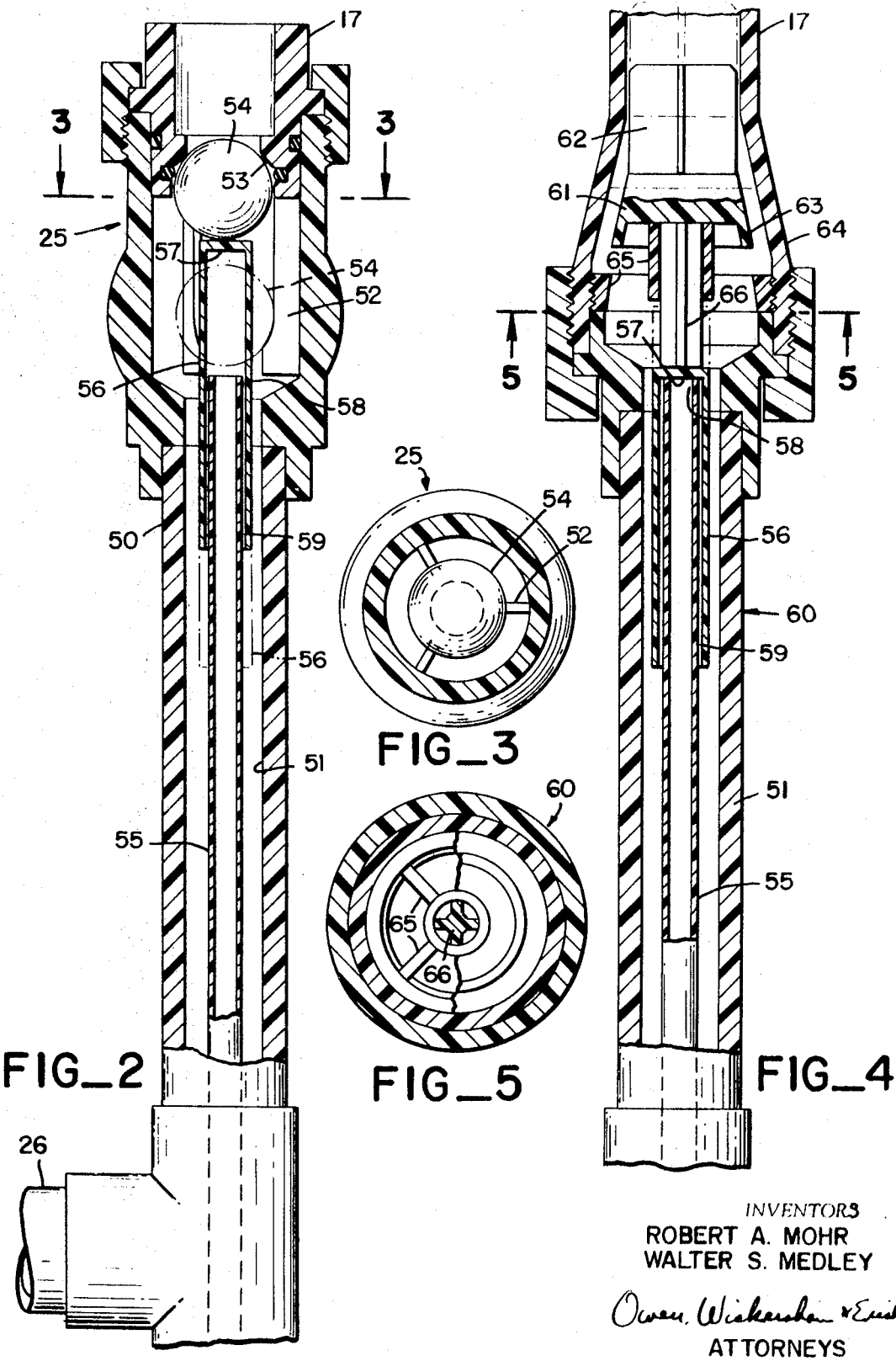

AUTOMATIC ADDITION OF LIQUID CHEMICALS IN LAUNDRIES

This application is a division of application Ser. No. 722,846 filed Apr. 22, 1968 now Pat. No. 3,495,743.

This invention relates to a system for automatically adding liquid chemicals to an automatic washing cycle or the like, especially for commercial laundries.

While so-called automatic laundries of the individual home type or of the type used in self-service laundries for individuals are well known, it is also well known that they do not add the chemicals automatically for cycle after cycle; instead, these washing machines have had to be hand-filled with soaps, bleaches, and so on. This is also true generally of large commercial laundries; very few have any provision for adding any chemicals automatically. The commercially used laundry chemicals are generally added as liquids, but, even so, in almost all commercial laundries chemicals are still added by hand.

An important factor in preventing the use of automatic devices for adding liquid laundry chemicals is the extremely corrosive nature of many of the chemicals used in commercial laundering. Instead of gentle soaps and mild bleaches, commercial laundries have relied on such metal-corroding materials as lye and other caustics, strong acids and chemicals which would not be considered safe around the home and which, correspondingly, have to be handled with care. These corrosive chemicals have hitherto made it uneconomical to attempt to provide automatic addition systems, for metering valves of the ordinary type are simply out of the question; these corrosive materials damage such metering valves so fast that they rapidly become inaccurate and unreliable and are destroyed within a short period of time.

Recently, some attempts at automatic liquid-addition systems have been made in cooperation with modern programmed control of commercial-laundry washing machines. While these systems have been able to eliminate the physical handling of chemicals, they have been very costly, very complicated, and have been subject to a great deal of trouble. A great deal of maintenance and much replacement of parts have been required by the very corrosive materials being handled, which have damaged the meters, orifices, valve seats, and other parts of such systems. As a result, these automatic systems for adding liquid chemicals have made little headway against the less convenient but more reliable hand addition.

Thus, an important object of this invention is to provide an automatic dispensing system for competent and substantially foolproof handling of corrosive chemicals in an automatic laundry cycle or in any programmed laundry system.

Another important object of the invention is to provide an inexpensive and practical automatic chemical dispensing system, one without meters, without timers, without large electric valves, and without measuring orifices that can wear or become clogged by corrosive liquids.

Achievement of these objects is attained by employing a novel gravity operated measuring system in which the only valve that comes into contact with the liquid is an all-plastic closure valve assembly, which is not damaged by quite corrosive chemicals. The only other valve used in each measuring system is in the pneumatic control which supplies compressed air to operate the closure valve.

To explain the invention in a little more detail, a liquid-chemical reservoir fills by gravity a measuring pot and associated conduit with the desired corrosive chemical, the volume of the conduit system being taken into account as part of the total volume measured. Then compressed air is used to close a valve that cuts off further supply of the liquid chemical and to discharge the measured quantity, i.e., the liquid in the measuring pot and the conduits beyond the valve. As stated, a gravity system is employed for measuring, and a constant liquid level or head governs the quantity measured. The closure valve is held closed as long as the compressed air continues to flow to it, and when the compressed air is cut off, the valve is opened to receive by gravity fill a new measured charge into the measuring system. During filling, any air trapped in the top of the metering pot is bled off above head level.

In a complete system employing this invention, there are sets of measuring units, each with its one closure valve, one measuring unit for each chemical for each washing machine. Since these commercial washing machines are large, washing several hundred pounds of laundry each cycle, there are usually only a few in any plant, and all the measuring units for each chemical may have a common gravity supply. For example, there may be six such chemicals to be added; if so, they can be added from a total of six supply tanks for the whole laundry, no matter how many washing machines are there. Moreover, the chemical addition is easily set up for incorporation into automatic programs for the washing machines. The possible chance that all of the washing machines in the laundry may demand the same liquid simultaneously does not affect either the measuring or the discharge of that liquid.

Other objects and advantages of the invention will appear from the following description of a preferred embodiment.

In the drawings:

FIG. 1 is a somewhat diagrammatic view in elevation of a system embodying the principles of the invention for automatically adding one liquid chemical to one automatic laundry machine.

FIG. 2 is a view in elevation and partly in section of a closure valve of a type suitable for use in the system of FIG. 1.

FIG. 3 is a view in section taken along the line 3–3 in FIG. 2.

FIG. 4 is a view in elevation and in section of a modified form of closure valve also usable in the system of FIG. 1.

FIG. 5 is a view in section taken along the line 5–5 in FIG. 4.

Each chemical is handled in liquid form and is measured by a system generally like that shown in FIG. 1. A compounding and storage tank 10 for a chemical 11 has an outlet 12 near its lower end 13. The outlet 12 leads to a circulating pump 14 that sends the liquid chemical 11 through a pipe 15 to a common conduit 16 which may go to several measuring units, one for each of several machines, by one or more branch conduits 17. Also, a branch conduit 18 leads up into a bottom inlet 19 of a gravity flow supply tank 20. The tank 20 has an overflow outlet 21 defining a head at a precisely determined level 22, and overflow liquid 11 from the outlet 21 returns by a conduit 23 to the tank 10. The pump 14 runs continuously, a throttling valve 24 being used to prevent the pump 14 from filling any measuring system any substantial amount above the head level 22.

For each washing machine in the overall system, there is a branch conduit 17 leading to a pneumatically operated closure valve 25 and from there by a conduit 26 into the upper end of a measuring pot 27. The measuring pot 27 has a lower outlet 28, preferably at its lowest end, into a conduit 29 which rises upwardly to a height well above the level 22. The valve 25, conduit 26, pot 27, and conduit 29 thus constitute a measuring unit or measuring system 30. Above the level 22 is a bend 31 from which a downwardly extending conduit 32 leads to a discharge hopper 33 which puts the chemical into a washing machine. The liquid 11 that flows by gravity into the unit 30 when the valve 25 is open, is automatically leveled at substantially the same level 22 as the outlet 21, with the aid of the throttle valve 24. All the conduits 15, 16, 17, 23, 26, 28, 29 and 31 are preferably corrosive-resistant plastic pipe, such as polyvinyl chloride, and so are the valves 24 and 25, and the pot 27.

Compressed air for pneumatic control of each valve 25 is provided from an air compressor 35 through a regulating valve 36 and conduit 37 to a valve 40. The valve 40 may be of any of several different types; for example, a solenoid-operated valve having a solenoid 41 and a valve spool 42 in a passage 43, with gravity or spring return. In its discharge position (i.e., for discharging the measured charge from the system 30 into the discharge hopper 33), the spool 42 connects the conduit 37 to an air conduit 44 which goes into an air inlet in the bottom of the valve 25, forcing the valve 25 to its closed position. Then the flow of air forces the measured charge of liquid out of the measuring system 30 into the discharge hopper 33. Thus, this blast of air exhausts one measured charge. So long as this air flows, its kinetic energy is used to maintain the valve 25 in its closed position; so no more liquid 11 comes into the measuring unit 30 as long as the valve 40 is in its "discharge" position.

When the solenoid 41 is caused to move the valve spool 42 to its "fill" position, the valve 40 then connects a conduit 45 which leads to the upper end of the measuring pot 27 to a conduit 46 which goes into the conduit 29 at a location above the predetermined level 22 and below and before the horizontal portion 31, so that any air trapped in the measuring unit 30 as it is being refilled by the liquid 11 is bled to the atmosphere by the conduit 31, 32. Also, any foam finding its way into the conduit 46 is retained on the measuring side of the top 31 of the discharge conduit, and the liquid component of the foam rejoins the rest of the liquid at the head level 22. This prevents liquid from the foam from going into the discharge hopper 33 at times when it might react with other chemicals that also are supplied to the washing machine through the hopper 33.

The operation of this system is simple and is substantially foolproof. The measuring unit 30 always measures liquid up to the head level 22. Then, when the air is applied, it closes the valve 25 and discharges the measured amount into the hopper 33, and the unit 30 is ready for a new charge as soon as the valve 25 is again opened.

FIGS. 3 and 4 show one type of plastic valve 25 that may be used in an all-plastic system. This valve 25 has a vertical housing 50 providing a vertical conduit 51. Above the conduit 51 is a valve cage 52 having a seat 53 at its upper end and a ball 54. An inlet tube 55 for air is connected to the conduit 44 and goes up inside the conduit 51, and at the top of this inlet tube 55 is a cylindrical sleeve 56 with a closed end 57, inverted over and covering the outlet 58 from the tube 55. When the compressed air is shut off by the valve 40, the sleeve rests on the end 58 and the ball 54 rests on or near it. When air is applied, the sleeve 56 is forced up to the position shown in FIG. 3, forcing the ball 54 against the seat 53, while at the same time air flows out through a clearance space 59 provided by the loose fit between the sleeve 56 and the main air conduit 55. Since both the ball 54 and the sleeve 56 are plastic, they are light in weight, and the ball 54 is immediately forced against its seat 53 and is maintained there by the kinetic energy of the flowing air, not by the air pressure, while the air flowing out the clearance 59 is directed down into the passage 26 to discharge the liquid from the system 30. This all-plastic system therefore demands little precision in manufacture of its parts, and they may be molded or extruded, depending on the part.

A modified form of valve 60 is shown in FIGS. 4 and 5, wherein a valve plug 61 has an upper cylindrical guide 62 member going up into the conduit 17 and a conical closure portion 63 mating with a conical seat 64. A cage 65 guides a lower stem 66. Again, all parts are plastic.

Thus, with these or other simple expedients, it is possible to obtain sufficient accuracy from a plastic valve without having any metal parts or any "metering" valves subject to corrosion. Polyvinyl chloride and other suitable plastics may be used. The real control is in the gravity system plus the pneumatically activated closure valve 25, and in this valve, the sleeve 56 is operated by kinetic energy rather than by pressure.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A pneumatically actuated closure valve for liquids, including in combination:

a seat;

a movable valve member below said seat, opened by gravity and closed against said seat by force from below, a vertical air conduit coming up from below said valve member and having an outlet end below said valve;

a sleeve larger in inside diameter than the outer diameter of said air conduit and having one closed end inverted on said air conduit;

means between said air conduit and said sleeve defining a flow space for air from said air conduit, said sleeve being movable up away from said air conduit by the kinetic energy of air flowing through said air conduit, against said closed end, and down between said sleeve and said air conduit and then out from said sleeve, so as to move said valve member against said seat, said sleeve being longer than its stroke when closing said valve; and casing means depending from said valve seat and surrounding said sleeve and air conduit and forming a collection chamber for liquid.